(12) United States Patent
Henglein et al.

(10) Patent No.: US 7,699,927 B2
(45) Date of Patent: *Apr. 20, 2010

(54) SIO₂ COATED PEARLESCENT PIGMENTS

(75) Inventors: Frank Henglein, Nuremberg (DE); Ulrich Schmidt, Hersbruck (DE)

(73) Assignee: Eckart GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/213,047

(22) Filed: Aug. 26, 2005

(65) Prior Publication Data

US 2006/0042508 A1    Mar. 2, 2006

Related U.S. Application Data

(60) Provisional application No. 60/606,687, filed on Sep. 1, 2004.

(30) Foreign Application Priority Data

Aug. 26, 2004   (DE) .................. 10 2004 041 592

(51) Int. Cl.
C04B 14/04   (2006.01)
C09C 1/00    (2006.01)
C04B 14/20   (2006.01)

(52) U.S. Cl. .................. 106/481; 106/416; 106/417

(58) Field of Classification Search .......... 106/445, 106/446, 415, 417, 436, 438, 442, 481, 416, 106/404, 439, 456
See application file for complete search history.

(56) References Cited

U.S. PATENT DOCUMENTS

| | | | | |
|---|---|---|---|---|
| 5,472,491 A | * | 12/1995 | Duschek et al. | 106/418 |
| 5,656,375 A | * | 8/1997 | Osterried et al. | 428/403 |
| 5,733,365 A | | 3/1998 | Halko et al. | 106/437 |
| 5,759,255 A | | 6/1998 | Venturini et al. | 106/418 |
| 5,908,498 A | | 6/1999 | Kauffman et al. | 106/437 |
| 6,176,918 B1 | * | 1/2001 | Glausch et al. | 106/415 |
| 6,488,757 B2 | * | 12/2002 | Glausch | 106/415 |
| 6,488,758 B2 | * | 12/2002 | Glausch et al. | 106/417 |
| 7,172,812 B2 | | 2/2007 | Greiwe et al. | |
| 7,300,510 B2 | * | 11/2007 | Seeger et al. | 106/401 |
| 2001/0056135 A1 | | 12/2001 | Kieser et al. | 523/171 |
| 2002/0096087 A1 | | 7/2002 | Glausch | 106/415 |
| 2002/0112645 A1 | | 8/2002 | Glausch et al. | |
| 2003/0029358 A1 | | 2/2003 | Roberts et al. | 106/499 |
| 2004/0139889 A1 | * | 7/2004 | Zimmermann et al. | 106/415 |
| 2004/0226480 A1 | | 11/2004 | Greiwe et al. | 106/403 |
| 2005/0223940 A1 | | 10/2005 | Seeger et al. | |

FOREIGN PATENT DOCUMENTS

| | | |
|---|---|---|
| DE | 21 06 613 | 8/1971 |
| DE | 2106613 C2 | 12/1971 |
| DE | 42 07 723 A1 | 9/1993 |
| DE | 44 43 825 A1 | 6/1996 |
| DE | 196 18 569 A1 | 11/1997 |
| DE | 196 39 783 A1 | 4/1998 |
| EP | 0 141 174 B1 | 5/1985 |
| EP | 0 446 986 B1 | 9/1991 |
| EP | 0 634 459 A2 | 1/1995 |
| EP | 0632 109 B1 | 1/1995 |
| EP | 0649 886 B1 | 4/1995 |
| EP | 0757085 A2 | 2/1997 |
| EP | 0 870 730 A1 | 10/1998 |
| EP | 0 888 410 B1 | 1/1999 |
| EP | 1 084 198 B1 | 3/2001 |
| EP | 1 203 795 A1 | 5/2002 |
| EP | 1203794 A1 | 5/2002 |
| EP | 1203795 | 5/2002 |
| EP | 1084198 B2 | 7/2002 |
| JP | 61-083258 | 9/1984 |
| JP | 09-104833 | * 4/1997 |
| JP | 09104833 A | * 4/1997 |
| WO | 98/13426 | 4/1998 |
| WO | 03/095564 A1 | 11/2003 |
| WO | WO03/095564 | * 11/2003 |
| WO | 2004/092284 A1 | 3/2004 |
| WO | 2004/092284 A1 | 8/2004 |
| WO | 2005/063897 A | 7/2005 |

OTHER PUBLICATIONS

European Search Report dated Nov. 14, 2005.

* cited by examiner

*Primary Examiner*—Jerry Lorengo
*Assistant Examiner*—Shuangyi Abu Ali
(74) *Attorney, Agent, or Firm*—Ostrolenk Faber LLP

(57) ABSTRACT

The invention relates to pearlescent pigments comprising platelet-shaped substrate, comprising metal oxide, and protective layer, said metal oxide having a refractive index of more than 1.8, where the protective layer is composed of an organic chemically surface modified SiO₂ layer, the organic chemical surface modification being applied on the SiO₂ layer. The invention further relates to a process for preparing these pearlescent pigments and to their use.

12 Claims, No Drawings

SIO₂ COATED PEARLESCENT PIGMENTS

CROSS REFERENCE TO RELATED APPLICATIONS

This application claims priority under 35 U.S.C. §119(e) of U.S. Provisional Patent Application No. 60/606,687 filed on Sep. 1, 2004, and of German Patent Application No. 102004041592.7, filed on Aug. 26, 2004, the contents of which are hereby incorporated by reference.

The invention relates to pearlescent pigments comprising a platelet-shaped substrate, comprising metal oxide, and protective layer, said metal oxide having a refractive index of more than 1.8. The invention further relates to processes for preparing such pearlescent pigments and also to their use.

Pearlescent pigments which comprise titanium dioxide in the top layer or which are constructed from particulate $TiO_2$ possess a certain photocatalytic activity. If, accordingly, UV light acts on a pearlescent pigment in the presence of water and oxygen, the UV activity of the pearlescent pigment may trigger an accelerated degradation of organic compounds, e.g., a binder matrix. Even the UV fraction present in daylight may cause this reaction; i.e., for applications such as automotive finishes, which are exposed directly to weathering, it is necessary to use specially stabilized pearlescent pigments. In order to counter this effect, which is deleterious for exterior application, pearlescent pigments can be furnished with a variety of protective coatings in order to reduce the photoactivity. This usually involves the precipitation onto the surface of the pigments, starting from aqueous metal salt solutions, of compounds of low solubility, the species involved in the protective coating generally involving not only oxygen compounds of aluminum or of silicon but also at least one transition metal, such as zirconium, manganese, cerium or chromium, for example. In order to promote compatibility of the pigments with different coating materials, but in particular with the more environmentally friendly water-based systems, it is usual to apply, in addition, a further organic modification to the top layer, by means of silanes, for example.

DE 2106613 describes pearlescent pigments which immediately following the coating of the mica flakes with metal oxide are coated in aqueous phase with a layer of silica and subsequently are calcined. The objective here is to exert a positive influence on the optical properties of the pigments such as luster, transparency, and color. However, these pigments are not adequately stabilized to UV light.

EP 0446986B1 relates to pearlescent pigments for coating applications, which by virtue of a smooth, unbroken layer of hydrated alumina possess an acceptable light stability and moisture resistance. Using acidic or alkaline aluminum salts, pearlescent pigments are coated in the aqueous phase under controlled conditions, and then dried.

In accordance with the teaching of EP 632109 a three-layer protective coat is applied to a platelet-shaped substrate coated with metal oxides. In a 1st stage $SiO_2$ is applied, in a 2nd stage a hydroxide or hydrated oxide of cerium, aluminum or zirconium is applied, and in a 3rd stage at least one hydroxide or hydrated oxide of cerium, aluminum or zirconium, and also an organic coupling reagent, are applied. This three-layer construction has the disadvantage of being very complicated and hence very costly to prepare. Moreover, prior to binding to the pigment surface, the coupling reagents must be hydrolyzed, and, in accordance with the teaching of EP 0 888 410 B1, only a maximum of 60% of the coupling reagents added can be bound to the pigment surface.

EP 0 888 410 B1 discloses modified pearlescent pigments based on a platelet-shaped substrate coated with metal oxides. In accordance with the teaching of EP 0 888 410 B1 the top layer is composed of at least two oxides, oxide mixtures or mixed oxides of silica, alumina, cerium oxide, titanium dioxide or zirconium dioxide, and of a water-based oligomeric silane system. The structure of the top layer is therefore likewise very complicated and hence costly and inconvenient to prepare.

In the case of the aforementioned prior art the UV activity of the $TiO_2$ interference layer is generally suppressed by means of at least two different oxide layers or one mixed layer of two oxides. Very frequently, furthermore, heavy metals such as zirconium, for example, or cerium are used which possess potential toxic properties. Earlier processes even use coatings containing chromium. The use of different oxides makes it also detrimental to the optical properties, particularly the luster. These relatively complex layer systems too, composed of two or more oxides or mixed oxides, are costly and inconvenient to prepare. For the precipitation of any metal oxide there is an optimum pH range. Coprecipitation of different oxides therefore usually takes place at pH levels which represent a compromise between the optimum levels for the precipitation of the single oxides. As a result, there is generally no possibility of precipitations which proceed under conditions that are optimum for all of the oxide components. As a result of the use of metal salts and of the need to maintain defined pH levels by metered addition of alkalis or mineral acids, numerous mineral salts, disadvantageously, are formed as waste products.

EP 1 084 198 B1 describes effect pigments which by virtue of their surface modification with reactive orientation agents exhibit very strong adhesion to the basecoat. EP 1 084 198 B1, however, does not disclose weather-stable and UV-stable pearlescent pigments.

It is an object of the invention to provide pearlescent pigments comprising metal oxide with a simply constructed and effective protective layer. The protective layer ought in particular to afford effective protection with regard to UV-light-induced photocatalytic activity of the pearlescent pigment without substantially impairing the optical properties such as luster. The pearlescent pigments ought to have good weather stabilities.

A further object is to provide a simple process for preparing pearlescent pigments comprising metal oxide and having a protective layer.

The object on which the invention is based is achieved through the provision of a pearlescent pigment comprising platelet-shaped substrate, comprising metal oxide, and protective layer, said metal oxide having a refractive index of more than 1.8, the protective layer being composed of an organic-chemically surface modified $SiO_2$ layer, the organic chemical surface modification being applied on the $SiO_2$ layer.

Preferred developments are specified in subclaims 2 to 16.

A platelet-shaped substrate comprising metal oxide comprises, for the purposes of the invention, in particular, pearlescent pigments comprising metal oxide, examples being metal oxide-coated mica flakes.

The organic chemical surface modification is not in the form of a mixed layer with the $SiO_2$ coating. In other words, in the preparation of the protective layer, $SiO_2$ was applied first to the effect pigment, and the organic chemical surface modification was applied subsequently.

The present invention provides a weathering-resistant and UV-resistant pearlescent pigment which has an $SiO_2$ coating without a heavy metal content. The organic chemical surface treatment can be carried out very advantageously in a simple way and embraces a great diversity of surface modifiers. In view of the multiplicity of surface modifiers that can be used, the pigment of the invention can be made compatible with a wide variety of coating systems. The optical properties such as luster are very good without the use of additional oxides having a high refractive index.

In its $SiO_2$ protective layer the effect pigment of the invention preferably contains no metals, metal compounds or metal oxides of the elements Ce, Al, Zr, Sn, Zn, Mn, Co, Cr, Mo, Sb and/or B. This means that the $SiO_2$ protective layer is composed preferably exclusively of $SiO_2$ and contains preferably no oxide layers, hydroxide layers and/or hydrated oxide layers of the aforementioned elements.

The organic chemical surface modification is composed preferably of one or more organofunctional silanes, aluminates, zirconates and/or titanates. With very great preference the organic chemical surface modification is composed of one or more organofunctional silanes applied to the $SiO_2$ surface. Unlike the pigments obtained in accordance with the water-based coating processes, described in the publications cited above, with at least two different oxides, the pigments coated in accordance with the invention have only one protective layer of $SiO_2$ and as a result, particularly in water-based coating systems, exhibit outstanding weather resistance and UV stability. During the preparation of the pigments of the invention, moreover, the reactions proceed almost quantitatively, so that there is no restriction whatsoever on working up, and particularly not on the isolation of product by filtration.

The object is further achieved by a process for preparing the pearlescent pigments of the invention, comprising the following steps:

(a) suspending platelet-shaped substrate comprising metal oxide in a liquid phase, said metal oxide having a refractive index of more than 1.8, (b) applying an $SiO_2$ layer to the platelet-shaped substrate, and (c) modifying the surface of the $SiO_2$ layer with organic chemical reagents.

Step (c) here is preferably carried out with one or more organofunctional silanes in a liquid phase having a predominant fraction of organic solvent. It is extremely advantageous in this context that many additives, particularly hydrophobic silanes, have very good solubility in predominantly organic solvents. As a result, the operating regime is simple and there is great variability in the choice of surface modifiers.

Surprisingly it has now been found that excellent UV and weather stability of pearlescent pigments can be achieved even with only one single $SiO_2$ layer and an organic chemical surface modification applied subsequently. Despite the low refractive index of $SiO_2$, the pearlescent pigments coated therewith exhibit a very good luster. It has surprisingly been found, furthermore, that even thin $SiO_2$ layers with subsequent organic chemical modification are sufficient for high UV stability.

Weather-stable pearlescent pigments preferably have $SiO_2$ layers in a fraction of 0.5% to 10% by weight of the pigment, more preferably of 1% to 7% by weight, and very preferably of 2% to 5% by weight. The % by weight figure here is based in each case on the total weight of the pigment.

In any specific case the amount of $SiO_2$ may depend on the fineness and, hand in hand therewith, on the specific surface area of the pearlescent pigment and also on the thickness of the metal oxide coating, preferably of the $TiO_2$ layer. Finer pigments and thicker $TiO_2$ layers may also necessitate a higher $SiO_2$ content. Above 10% by weight of $SiO_2$, no further improvement is generally observed in weather or UV stability. Oftentimes, indeed, the properties become poorer, presumably because the thicker protective layers are fragile and cracks are produced more readily, thereby lowering the barrier effect of the layer. Below 0.5% by weight the protective effect of the $SiO_2$ layer is generally too low.

The surprisingly high activity of a single silicate coating for the weather stabilization of pearlescent pigments is thought to be attributable, among other things, to the electronic nature of the $SiO_2$ layer. It is thought that the energetic position of the band edges of $SiO_2$ is favorable, in comparison to that of the $TiO_2$ used preferentially, in such a way that the transfer of both holes and electrons, which form in the $TiO_2$ semiconductor following absorption of UV photons, to the boundary of the pigment is effectively suppressed ("diode effect"). This appears plausible, since effective weather stabilization of pearlescent pigments is observed even with extremely thin $SiO_2$ layers whose thicknesses, when converted, are only about 2 to 3 nm. Besides an electronic effect, a certain barrier effect is thought also to be critical to the weather stabilization. Here, among other factors, water is kept away from the $TiO_2$ boundary. In view of the low layer thicknesses, however, this effect is thought not to be decisive. The thickness of the $SiO_2$ layers is preferably in the range from 2 nm to 20 nm, more preferably from 2.5 nm to 7 nm.

In the case of the pearlescent pigments of the invention, the $SiO_2$ protective layer is additionally organic-chemically surface modified, in order to allow the pigment compatibility with the binder of the coating system. The organic chemical surface modification is preferably accomplished by means of one or more organofunctional silanes, aluminates, zirconates and/or titanates.

These surface modifiers, prior to application to the $SiO_2$ layer, can be present in monomeric, oligomeric or polymeric form.

Preferably, however, prior to application to the $SiO_2$ layer, the surface modifiers are in monomeric form, since in this way the silanes are packed on the surface in a more ordered fashion and hence presumably more closely. Furthermore, as organic chemical surface modifiers, it is preferred to use organofunctional silanes. These silanes inherently possess a pronounced propensity toward condensation and hence a capacity to bind to an $SiO_2$ surface. The $SiO_2$ surface is terminated with silanol groups (Si—O—H), which on account of their chemical similarity to organofunctional silanols offer the best possibilities for attachment.

In one further-preferred embodiment the organofunctional silanes used comprise at least one silane furnished with at least one functional bond group.

A functional bond group here is a functional group which is able to enter into chemical interaction with the binder. This chemical interaction may be composed of a covalent bond, a hydrogen bond or an ionic interaction, and so on.

The functional bond groups comprise, for example, acrylate, methacrylate, vinyl, amino, cyanate, isocyanate, epoxy, hydroxyl, thiol, ureido and/or carboxyl groups.

The choice of suitable functional group depends on the chemical nature of the binder. It is preferred to choose a functional group which is chemically compatible with the functionalities of the binder, in order to allow effective attachment. In regard to weather-stable pearlescent pigments this quality is very important, since in this way a sufficiently strong adhesion is provided between pigment and cured binder. This can be tested for, for example, in adhesion tests such as the cross-cut test with condensation exposure, in accordance with DIN 50 017. Passing such a test is a necessary condition for the use of weather-stable pearlescent pigments in an automotive finish.

Organofunctional silanes suitable as surface modifiers, with corresponding functional groups, are available commercially. By way of example they include many representatives of the products produced by Degussa, Rheinfelden, Germany and sold under the trade name "Dynasylan®", and the Silquest® silanes produced by OSi Specialties or the GENOSIL® silanes produced by Wacker. Examples of such silanes are 3-methacryloyloxypropyl-trimethoxysilane (Dynasylan MEMO, Silquest A-174NT), vinyltri(m)ethoxysilane (Dynasylan VTMO and VTEO, Silquest A-151 and A-171), 3-mercaptopropyltri(m)-ethoxysilane (Dynasylan MTMO or 3201; Silquest A-189), 3-glycidyloxypropyltrimethoxysilane (Dynasylan GLYMO, Silquest A-187), tris(3-trimethoxysilylpropyl)isocyanurate (Silquest Y-11597), gamma-mercaptopropyltri-methoxysilane (Silquest A-189), bis(3-triethoxysilyl-propyl) polysulfide (Silquest A-1289), bis(3-triethoxy-silyl) disulfide (Silquest A-1589), beta-(3,4-epoxy-cyclohexyl)ethyltrimethoxysilane (Silquest A-186), gamma-isocyanatopropyltrimethoxysilane (Silquest A-Link 35, Genosil GF40), (methacryloyloxymethyl)trimethoxysilane (Genosil XL 33) and (isocyanatomethyl)trimethoxysilane (Genosil XL 43).

In one preferred embodiment the organofunctional silane or silane mixture that modifies the $SiO_2$ layer comprises at least one amino-functional silane. The amino function is a functional group which is able to enter into chemical interactions with the majority of groups present in binders. This interaction may constitute a covalent bond, such as with isocyanate functions of the binder, for example, or hydrogen bonds such as with OH or COOH functions, or else ionic interactions. It is therefore very suitable for the purpose of chemically attaching the effect pigment to different kinds of binder.

For this purpose it is preferred to take the following compounds:

aminopropyltrimethoxysilane (Dynasylan AMMO; Silquest A-1110), aminopropyltriethoxysilane (Dynasylan AMEO) or N-(2-aminoethyl)-3-aminopropyltrimethoxysilane (Dynasylan DAMO, Silquest A-1120) or N-(2-aminoethyl)-3-aminopropyltriethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), 4-amino-3,3-dimethylbutyltrimethoxysilane (Silquest Y-11637), (N-cyclohexylaminomethyl)-triethoxysilane (Genosil XL 926), (N-phenylaminomethyl)trimethoxysilane (Genosil XL 973), and mixtures thereof.

Surprisingly, further advantageous performance properties have been obtained by means of an organic chemical surface modification of the $SiO_2$ layer which comprises at least one silane having at least one functional bond group and at least one silane without a functional bond group.

In this case, with particular preference, each silane having at least one functional bond group, as described above, is an aminosilane.

In one embodiment which is further particularly preferred each silane without a functional bond group as described above, is an alkylsilane. The alkylsilane preferably has the formula (I):

$$R_{(4-z)}Si(X)_z \quad (I)$$

In this formula z is an integer from 1 to 3, R is a substituted or unsubstituted, unbranched or branched alkyl chain having 10 to 22 carbon atoms, and X is a halogen and/or alkoxy group. Preference is given to alkylsilanes having alkyl chains with at least 12 carbon atoms. R can also be joined cyclically to Si, and in that case z is usually 2.

A silane of this kind produces strong hydrophobicization of the pigment surface. This in turn results in the pearlescent pigment thus coated having a tendency to float to the top in the coating. In the case of platelet-shaped effect pigments, behavior of this kind is referred to as "leafing".

Completely surprisingly it has now been found that a silane mixture composed of at least one silane which possesses a functional group which allows attachment to the binder and an alkylsilane as described above without an amino group, which is poorly soluble or insoluble in water, allows the pearlescent pigments to have optimum performance properties.

The pearlescent pigments are bound so well to the coating material that there is no loss of adhesion. On the other hand, the pigments exhibit outstanding plane-parallel orientation in the coating material, and also a "residual leafing" behavior; in other words, a statistically measurable fraction of the pigments is located in the upper region of the cured basecoat in the vicinity of the clearcoat. An arrangement of the pigments at the upper boundary of the basecoat normally results in a loss of adhesion properties, since because of its platelet-shaped structure the pearlescent pigment acts as a disruptive barrier between clearcoat and basecoat. In the case of the present invention, surprisingly, the pigments arrange themselves not at the upper boundary of the basecoat but only in the vicinity of the upper boundary of the basecoat, thereby enabling reliable attachment of the clearcoat to the basecoat. In other words, advantageously, the pigments of the invention do not act as a disruptive barrier between clearcoat and basecoat.

This residual leafing behavior and the very good plane-parallel orientation bring about improved luster properties and a high cleanness of hue on the part of the pearlescent pigments of the invention in, for example, a coating system.

At an alkylsilane chain length below 10 carbon atoms the hydrophobicization of the surface is not sufficient for such effect to be displayed. It is thought that in this case it is not possible for any segments to form on the pigment surface in which the alkyl chains are arranged in parallel to one another in the manner of a "self-assembly monolayer". Layers of this kind are obtained preferentially if a surface is coated with additives which have an anchor group to the surface and alkyl chains having at least 10 carbon atoms.

If the silanes possess more than 22 carbon atoms, as a general rule the attachment to the binder system by the silane with functional attachment groups is no longer good enough; i.e., adhesion problems are observed in the condensation test in accordance with DIN 50 017.

In a further preferred embodiment the surface modification comprises silanes of the structural formula (II)

$$(R^1-X-[A-Y]_n-B)_{(4-z)}Si(OR^2)_z \quad (II)$$

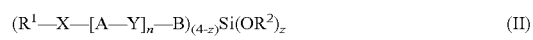

where
n=1 to 100,
z is an integer from 1 to 3,
$R^1$ is straight- or branched-chain alkyl having 1 to 12 carbon atoms, which may be substituted by halogens; is aryl having 6 to 12 carbon atoms; or is aryl having 6 to 12 carbon atoms, which may be substituted by alkyl having 1 to 6 carbon atoms and/or by halogens;
$R^2$ is straight- or branched-chain alkyl having 1 to 6 carbon atoms;

A and B independently of one another are a divalent group composed of straight- or branched-chain alkylene having 1 to 12 carbon atoms; arylene having 6 to 12 carbon atoms; or arylene having 6 to 12 carbon atoms, which may be substituted by alkyl having 1 to 6 carbon atoms and/or by halogens; and X and Y independently of one another are O or S. Halogen here is F, Cl, Br and/or I.

In preferred embodiments $R^1$ and $R^2$ independently of one another are methyl, ethyl, n-propyl, isopropyl, n-butyl, isobutyl, tert-butyl, phenyl, biphenylyl, naphthyl or mixtures thereof.

In further-preferred embodiments A and B independently of one another are composed of ethylene, propylene, 1-butylene, 2-butylene, phenylene, phenylene substituted by alkyl having 1 to 6 carbon atoms, and mixtures thereof.

These silanes may be present in pure form with defined n or in mixtures with different n.

According to one preferred embodiment n is situated within a range from 1 to 20, more preferably from 5 to 15.

In the case of one particularly preferred embodiment the surface modification comprises silanes of the formula (III)

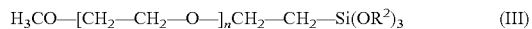

where n=1 to 100, preferably 1 to 20, more preferably 5 to 25, and $R^2$ has the same definition as indicated above. With particular preference $R^2$ independently at each occurrence is methyl or ethyl.

These silanes as well may be present in pure form with a defined n or in mixtures (different n). By virtue of their oxyethylene group(s) within the chain, silanes of this kind have particularly good wetting and dispersing properties. Such silanes are available from OSi Specialties under the product name Silquest® A-1230.

In a further embodiment the surface modifier used may be an oligomeric silane mixture as described in DE 4443825 A1, hereby incorporated by reference.

The amount of the silane surface modifiers applied, in relation to the total $SiO_2$ aftercoated pearlescent pigment, is preferably 0.2% to 5%, more preferably 0.3% to 3%, and very preferably 0.5% to 2.0% by weight. In any specific case, here again, the amount may depend on the fineness and specific surface area of the pearlescent pigment. Generally, however, an amount in the order of magnitude of a silane monolayer on the pigment surface is sufficient. Excessively small amounts do not result in adequate coating of the pigment surface and lead, consequently, to poor condensation test results in coating applications (test in accordance with DIN 50 017).

As the platelet-shaped substrate provided inventively with the protective layer it is preferred to use the following substrates:

$TiO_2$ and/or iron oxide coated mica flakes,
$TiO_2$ and/or iron oxide coated glass flakes,
$TiO_2$ and/or iron oxide coated alumina flakes,
$TiO_2$ and/or iron oxide coated $SiO_2$ flakes,
bismuth oxychloride flakes,
pure $TiO_2$ flakes, and mixtures thereof.

In order to produce a good pearl luster effect, the refractive index of the metal oxide layer is greater than 1.8, preferably greater than 2.2, more preferably greater than 2.3, and very preferably greater than 2.4, even more preferably 2.5 or more.

It is preferred to use substrates coated with $TiO_2$. Mica pigments coated with $TiO_2$ and/or iron oxide are available commercially, for example, under the name PHOENIX® (Eckart). $Al_2O_3$ flakes coated with $TiO_2$ and/or $Fe_2O_3$ are supplied under the trade names Xirallic®, and correspondingly coated $SiO_2$ flakes under the trade name Colorstream®, by Merck. Multilayer interference pigments as well, as described for example in DE 19618569, composed of a support material coated with alternating layers of metal oxides of low and high refractive index, can be aftercoated in accordance with the invention.

A process for providing a pearlescent pigment of the invention comprises the following steps:

(a) suspending platelet-shaped substrate comprising metal oxide in a liquid phase, said metal oxide having a refractive index of more than 1.8, (b) applying an $SiO_2$ layer to the platelet-shaped substrate, and (c) modifying the surface of the $SiO_2$ layer with organic chemical reagents.

The process for preparing these pearlescent pigments, with very great advantage, is cost-effective and allows coating in one step.

In one preferred process step (c) for modifying the $SiO_2$ layer is carried out in a liquid phase with a predominant fraction of organic solvent. By a predominant fraction of organic solvent is meant here a solvent mixture of a kind which contains preferably less than 50% by weight of water, i.e., more than 50% by weight of organic solvent.

Organic solvents used include, for example, ethers, esters, alcohols, ketones, aldehydes or white spirit.

As predominantly organic solvent mixtures it is preferred to use alcoholic solvents having an alcohol fraction of 50% to 99% by weight. The alcohol fraction is preferably 60% to 95% by weight and more preferably 70% to 90% by weight. Below an alcohol fraction of 50% the performance properties of the coated pearlescent pigments may be impaired, and so in the case of a coating there may be a loss of luster. Above 99%, finally, the reaction mixture apparently contains too little water, since the yields of $SiO_2$ are poor and the reaction times are too long.

Examples of suitable alcohols themselves include methanol, ethanol, n-propanol, isopropanol, n-butanol, 2-methylpropanol, 2-methoxypropanol, butyl glycol, etc. Also possible are mixtures of these alcohols in any desired proportions. The residual fraction of the mixture is composed on the one hand of the water reaction partner; on the other hand, further organic solvents may be present.

The advantage associated with the use of predominantly organic solvents in step (c) lies in the very good solubility of many silanes, especially alkoxysilanes, in organic solvents. As a result it is possible to use not only hydrophilic silanes but also, in particular, hydrophobic silanes. In aqueous solutions, in contrast, many silanes are not soluble. In this case the remedy taken is a controlled prehydrolysis of the silanes [U.S. Pat. No. 5,759,255] or the synthesis of special water-soluble oligomer systems [DE 196 39 783]. Prehydrolyzed silane systems, however, lack great storage properties. As a result of further hydrolysis or condensation processes, the silanes may undergo further crosslinking, may undergo oligomerization, and may eventually become unusable for the purpose of surface modification. Water-soluble oligomer systems, finally, must be synthesized, which is costly and inconvenient; they are likewise more difficult to store, and are limited in the range of possibilities for variation of the organofunctional groups. In particular, alkylsilanes having 10 to 22 carbon atoms are insoluble or virtually insoluble in water. In contrast, apolar alkylsilanes of this kind can be dissolved without problems in the solvents used here, which is advantageous for the formation of a layer on the pigment surface. Moreover, efficient utilization of the relatively expensive silane materials is possible.

Aminosilanes, in contrast, although generally soluble in water, undergo autocatalytic hydrolysis and condensation to form oligomeric and polymeric systems. Their storage stability in water is therefore only limited.

As a result of the greater number of silanes available as surface modifiers, the surface properties of the pearlescent pigments of the invention can be adapted in a very variable way to the different coating systems. With prehydrolyzed silanes and particularly with water-soluble silane oligomers which are applied in aqueous solution, in contrast, one is limited to short-chain aliphatic or aromatic radicals having a maximum of 8 carbon atoms.

Steps (a) and (b) of the process of the invention are advantageously carried out in the same liquid medium. In one preferred process here the $SiO_2$ layer is applied by means of a sol-gel process in predominantly organic solvent mixture. With particular preference they are applied in the same, predominantly organic solvent mixture in which step c) subsequently takes place.

A feature of the one-pot process described here is that the surface additives (e.g., silanes) are added to the reaction solution immediately following the precipitation of the $SiO_2$ layer and hence undergo hydrolysis in situ and finally, by condensation with hydrogen groups of the $SiO_2$ layer, attach covalently to the surface. The result is an extremely simple operating regime in conjunction with a very good selection of useful silanes.

In step (b) in this process the $SiO_2$ layer is applied using preferably tetraalkoxysilane and with optional addition of water. Sol-gel processes of this kind, carried out in a predominantly organic solvent mixture, have a range of advantages over the deposition of $SiO_2$ from aqueous silicate solutions, as have been described in the prior art. On the one hand, this is a substantially salt-free process. Modern-day binder systems are very sensitive in respect of the presence of salts. These salts, for example, disrupt the colloidal stability of binder particles and may therefore result in uncontrolled coagulation of the binder system of a coating material. AS a result the coating material becomes unusable. Furthermore, water-soluble constituents such as salts promote osmotic processes in coating systems, with the consequence that, owing to accumulation of water in the coating film, there may be blistering and delamination problems. By virtue of a pearlescent pigment preparation process that is salt-free per se, costly and inconvenient purification steps are done away with. This means that, following suspension, the pigments of the invention have conductivities which are generally below the conductivity of 150 μS/cm that is normally called for. The only byproduct of the reaction are alcohols, which together with the alcoholic solvent can be worked up by distillation, for example, and recycled.

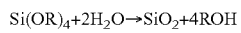

$$Si(OR)_4 + 2H_2O \rightarrow SiO_2 + 4ROH$$

A further advantage lies in the use of a monomeric starting material for preparing the $SiO_2$ layer. In the case of the sol-gel process in organic solvent the reaction begins with the hydrolysis of the tetraalkoxy-silane, i.e., a molecular monomer. Aqueous silicate solutions such as waterglass, in contrast, are always already in an oligomeric form of precondensed —O—Si—O— units. In the case of the sol-gel process used preferably in accordance with the invention, therefore, the hydrolysis step and the subsequent condensation can be more effectively controlled. This has advantageous consequences for the quality and morphology of the layer formed. It is thought that the controlled deposition of the $SiO_2$ in the sol-gel process in predominantly organic solvent mixture is another factor responsible for the high quality of the layer and the resultant very good barrier effect.

Starting compounds used for the $SiO_2$ layer are preferably tetraalkoxysilanes. Examples thereof include the following: tetramethoxysilane, tetraethoxysilane, tetrapropoxysilane, tetraisopropoxysilane or tetrabutoxysilane, or mixtures thereof.

The catalysis of the sol-gel process for $SiO_2$ deposition takes place preferably in a basic medium. Catalysts used are preferably nitrogen-containing bases. Examples thereof include ammonia, hydrazine, methylamine, ethylamine, triethanolamine, dimethylamine, diethylamine, methylethylamine, trimethylamine, triethylamine, ethylenediamine, trimethylenediamine, tetramethylenediamine, 1-propylamine, 2-propylamine, 1-butylamine, 2-butylamine, 1-propylmethylamine, 2-propylmethylamine, 1-butylmethylamine, 2-butylmethylamine, 1-propylethylamine, 2-propylethylamine, 1-butylethylamine, 2-butylethylamine, piperazine, and pyridine.

In the case of the process described here the organic chemical surface modification is applied to the $SiO_2$ layer. For this purpose, step (c) is carried out when the tetraalkoxysilane has undergone at least 85%, preferably at least 90%, and more preferably at least 95% reaction. Coprecipitation with oxide that has not yet been deposited is not necessary and not advantageous.

In a further version of the process of the invention an $SiO_2$ coating operation can also take place first in the aqueous medium from silicate solutions, as described for example in DE 2106613, example 1, or in example 1 of DE 4207723, and also in example 1 of EP 649886 B1 or in EP 0141174, lines 30-37, which are hereby incorporated by reference. Thereafter a calcining step can be carried out.

The precipitation of the surface modifiers ought preferably, however, to take place in a predominantly organic solvent mixture. Where appropriate, prior to the precipitation of the surface modifiers, it is also possible to apply a further $SiO_2$ layer by a sol-gel process.

Preferably, however, the above-described one-pot process is employed, using sol-gel processes in a predominantly organic solvent mixture.

The pearlescent pigments of the invention are used preferably in varnishes, powder coatings, printing inks, plastics, coatings, and cosmetic preparations.

In particular the pearlescent pigments of the invention find use as weatherproof pearlescent pigments in automotive finishes and also in powder coatings and coatings for exterior and architectural facing applications.

The object on which the invention is based is further achieved by an article having a coating comprising pearlescent pigment as claimed in any one of claims 1 to 16. In accordance with a preferred development of the invention the article is a vehicle body, preferably a motor vehicle body, or an architectural facing, a facing element for example.

The examples which follow are intended to describe the invention in more detail, though without restricting it:

EXAMPLE 1

100 g of commercially available blue pearlescent pigment based on $TiO_2$ coated mica with a fineness of 5-25 μm (PHOENIX PX 2261, Eckart) was suspended in 300 ml of isopropanol and the suspension was brought to boiling temperature. With stirring, a solution of 0.45 g of ethylenediamine in 9.5 g of $H_2O$ was added. Thereafter, over a period of 2 h, 17.5 g of tetraethoxysilane in 15 g of isopropanol were introduced continuously using a metering pump (Ismatec). Subsequently the suspension was left to react further for 6 h. Then 0.6 g of Dynasylan AMEO and 1.7 g of Dynasylan 9116 were added and the mixture was allowed to slowly cool. It was stirred at room temperature overnight and filtered with suction the next day. The pigment filtercake was subsequently dried in vacuo at 100° C. for 6 h. The pigment had a theoretical $SiO_2$ content of 4.2% by weight.

EXAMPLE 2

As example 1, but as an uncoated pearlescent pigment 100 g of blue pearlescent of fineness 10-40 μm (PHOENIX PX 1261, Eckart) were used. Aftercoating was carried out with 0.5 g of Dynasylan AMEO and 1.4 g of Dynasylan 9116.

The pigment had a theoretical $SiO_2$ content of 4.2% by weight.

COMPARATIVE EXAMPLE 3

Commercially available Exterior CFS Mearlin Super Blue 6303Z (10-40 μm) from Engelhard.

COMPARATIVE EXAMPLE 4

Prepared as example 1, but without aminosilane. Aftercoating took place only with 1.7 g of Dynasylan 9116.

The inventive and comparative examples were subjected to different tests in relation to weather stability and to UV stability. Below, the test methods are described and the results set out.

A Condensation Test

A number of pigment samples were incorporated into a water-based varnish system and the test applications were produced by spray coating. The basecoat was overcoated with a commercially customary 1K [1-component] clearcoat and then baked. These applications were tested in accordance with DIN 50 017 (constant condensation climate). The adhesive strength was tested by means of cross-cut in accordance with DIN EN ISO 2409 immediately after the end of the test and one hour later, in comparison with the unexposed sample. In this test Gt 0 denotes no change and Gt 5 denotes a very sharp change. The swelling behavior was assessed visually immediately after condensation exposure, along the lines of DIN 53230. Here the index 0 denotes no change and the index 5 denotes a very sharp change. The blistering was assessed visually in accordance with DIN 53209. Here again the relative evaluation scale ranges from 0 ("very good") to 5 ("very poor"). "m" denotes the frequency and "g" the size of the blisters. Finally, the DOI (distinctness of image) was assessed visually. It can change essentially as a result of swelling events.

TABLE 1

| | Condensation and cross-cut tests | | | | | | |
|---|---|---|---|---|---|---|---|
| | Cross-cut | | | | | DOI | |
| Sample | 0-specimen | 0 h | 1 h | Blistering | Swelling | 0 h | 1 h |
| Example 1 | Gt 0 | Gt 0 | Gt 0 | m1/g1 | 2 | 2 | 2 |
| Example 2 | Gt 0 | Gt 0 | Gt 0 | m1/g1 | 2 | 2 | 2 |
| Comp. example 3 | Gt 0 | Gt 0 | Gt 0 | m1/g1 | 2 | 2 | 1 |
| Comp. example 4 | Gt 1 | Gt 4 | Gt 2 | m2/g3 | 2 | 2- | 2 |

Inventive examples 1 and 2 are comparable in every respect with the prior-art comparative example 3, and pass the condensation test. Comparative example 4, where the aftercoating consisted solely of an alkylsilane (16 carbon atoms) without a functional group that attaches to the varnish system, however, is much poorer in terms of its adhesive strength in the cross-cut test, and fails the test.

Consequently, with this sample, no further exposure tests such as a WOM test were carried out.

B WOM Test

The pigment samples were incorporated into a water-based varnish system and the test applications were produced by spray coating. The basecoat was overcoated with a commercially customary clearcoat and then baked. The accelerated weathering test was carried out in accordance with SAE-J 1960 in an Atlas Ci-65 A Xeno-Test apparatus with water-cooled 6.5 kW xenon lamps.

The determination of the ΔE values and also the gray scale classification took place in each case relative to the corresponding unexposed sample.

WOM tests are generally regarded, among all accelerated weathering methods, as being those which exhibit the best correlations to Florida weathering tests. Passing a Florida test is a prerequisite, for example, for a coating to be approved for the automotive sector. 4000 h in the WOM test correspond approximately to the requisite two-year Florida test.

C UV Stability in Drawdowns

This test was carried out along the lines of the UV test described in EP 0 870 730 for determining the UV activity of $TiO_2$ pigments as an accelerated test in relation to photochemical activity.

For this test, 1.0 g of the pearlescent pigment was dispersed in 9.0 g of a double-bond-rich melamine-containing varnish. Drawdowns were prepared on cardboard-backed paper and were dried at room temperature. The drawdowns were divided and one of the two sections in each case was stored in the dark as an unexposed comparison specimen. Thereafter the samples were irradiated for 150 minutes in a QUV instrument from Q-Panel with UV-containing light (UVA-340 lamp, irradiance 1.0 W/m²/nm). Immediately after the end of the test, calorimetric values of the exposed test specimens were determined relative to the respective retained specimen, using a Minolta CM-508i colorimeter. The resultant ΔE* values, calculated according to the Hunter L*a*b* formula, are shown in tab. 2.

In the test, essentially a gray-blue discoloration of the $TiO_2$ layer of the pearlescent pigment in the drawdowns is observed, owing to Ti (III) centers formed under the influence of the UV light. The condition for this is that the electron hole has departed, in terms of space, from the $TiO_2$ and—as a result, for instance, of reaction with olefinic double bonds of the binder—is unable to recombine immediately with the remaining electron. Since a melamine-containing varnish layer significantly slows down the diffusion of water (vapor) and oxygen to the pigment surface, reoxidation of the titanium (III) centers occurs with a marked delay, so that the graying can be measured and the ΔE* value can be employed as a measure of the light stability of the pigments. A greater numerical ΔE* value for the exposed sample relative to the unexposed retained specimen therefore implies a lower light stability of the pigment under investigation.

When this test is used with the inventive examples it is necessary to distinguish whether samples with or without organic surface modification (OSM) are being used.

With an organic surface modification, the pigment surface is isolated at least partly from the reactive, unsaturated melamine system. Consequently, the redox reaction that is absolutely necessary for the chromoformic Ti (III) centers to form cannot take place with the same efficiency and speed as in the case outlined first of all. Accordingly, in the case of pigments with organic surface modification, a far lesser discoloration is automatically found. This does not mean, however, that the UV-catalytic activity is low in this case. Therefore, in all cases, the ΔE* values for a pearlescent pigment of the invention which has not been organically modified are somewhat higher than for the surface-aftertreated samples.

TABLE 2

WOM and UV drawdown test results

| Sample | WOM test ΔE* | Gray scale | UV test ΔE* (without OSM) | ΔE* (with OSM) |
|---|---|---|---|---|
| Example 1 | | | 2.1 | 1.0 |
| 500 h | 0.2 | 5 | | |
| 1000 h | 0.2 | 5 | | |
| 2000 h | 0.3 | 5 | | |
| 3000 h | 0.3 | 4-5 | | |
| 4000 h | 0.4 | 4-5 | | |
| Example 2 | | | 2.6 | 1.4 |
| 500 h | 0.1 | 5 | | |
| 1000 h | 0.2 | 5 | | |
| 2000 h | 0.2 | 5 | | |
| 3000 h | 0.2 | 4-5 | | |
| 4000 h | 0.4 | 4-5 | | |
| Comparative example 3 (Exterior CFS Mearlin Super Blue 6303Z) | | | — | 2.3 ± 0.3 |
| 500 h | 0.4 | 5 | | |
| 1000 h | 0.5 | 5 | | |
| 2000 h | 0.8 | 4-5 | | |
| 3000 h | 0.8 | 4-5 | | |
| 4000 h | 1.0 | 4 | | |

OSM: Organic surface modification

If the color changes ΔE* in the WOM test for the blue pigments of inventive examples 1 and 2 are compared with the same results for comparative example 3, which are representative of the prior art, lower values and hence better weather resistances are obtained. Similar comments apply to the light stabilities determined in the drawdown test. These results appear particularly remarkable since in this case only one single oxidic layer was used to stabilize the pearlescent pigments.

The pearlescent pigments of the invention are therefore capable of improving the weather and UV stability with only one single $SiO_2$ layer when set against comparative examples from the prior art.

What is claimed is:

1. A pearlescent pigment comprising platelet-shaped substrate, comprising metal oxide, and protective layer that is from 2 nm to 20 nm thick, said metal oxide having a refractive index of more than 1.8, wherein the protective layer is applied directly to the substrate and consists of an modified only one single SiO2 layer that is composed exclusively of SiO2, wherein the SiO2 content of the pigment is 0.5% to 10% by weight based on the total weight of the pigment, does not include any metal compound other than SiO2 and includes an organic chemical surface modification, the organic chemical surface modification being applied on the SiO2 layer, wherein the SiO2 layer is surface modified with organofunctional silanes, wherein the organofunctional silanes comprise at least one silane having at least one functional bond group, wherein at least one functional bond group is selected from the group consisting of acrylate, methacrylate, vinyl, amino, cyanate, isocyanate, epoxy, hydroxyl, thiol, ureido, carboxyl groups, and mixtures thereof, and at least one silane without a functional bond group, wherein the silane without a functional bond group is an alkylsilane having the formula (I):

$$R_{(4-z)}Si(X)_z \qquad (I)$$

wherein:
z is an integer from 1 to 3;
R is a substituted or unsubstituted, unbranched or branched alkyl chain having 0 to 22 carbon atoms; and
X is a halogen and/or alkoxy group, or
the silane without a functional bond group has a structural formula (II):

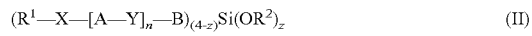

$$(R^1-X-[A-Y]_n-B)_{(4-z)}Si(OR^2)_z \qquad (II)$$

wherein:
n=1 to 100;
z is an integer from 1 to 3;
$R^1$ is a straight- or branched-chain alkyl having 1 to 12 carbon atoms, which may be substituted by one or more halogen atoms; an aryl having 6 to 12 carbon atoms; or an aryl having 6 to 12 carbon atoms, which is substituted by alkyl having 1 to 6 carbon atoms, halogen atoms, or a combination thereof;
$R^2$ is a straight- or branched-chain alkyl having 1 to 6 carbon atoms;
A and B are independently a divalent group composed of straight- or branched-chain alkylene having 1 to 12 carbon atoms; an arylene having 6 to 12 carbon atoms; or an arylene having 6 to 12 carbon atoms, which is optionally substituted by alkyl having 1 to 6 carbon atoms, halogen atoms, or a combination thereof; and X and Y and are independently O or S.

2. The pearlescent pigment as claimed in claim 1, wherein the surface modifiers prior to application to the $SiO_2$ layer are in monomeric, oligomeric or polymeric form.

3. The pearlescent pigment as claimed in claim 1, wherein the surface modifiers prior to application to the $SiO_2$ layer are in monomeric form.

4. The pearlescent pigment as claimed in claim 1, wherein the at least one silane without a functional bond group is an organofunctional silane which is poorly soluble or insoluble in water.

5. The pearlescent pigment as claimed in claim 1, wherein $R^1$ and $R^2$ are selected independently of one another from the group consisting of methyl, ethyl, n-propyl, isopropyl, n-butyl, isobutyl, tert-butyl, phenyl, biphenylyl, naphthyl, and mixtures thereof.

6. The pearlescent pigment as claimed in claim 1, wherein A and B are selected independently of one another from the group consisting of ethylene, propylene, 1-butylene, 2-butylene, phenylene, phenylene substituted by alkyl having 1 to 6 carbon atoms, and mixtures thereof.

7. The pearlescent pigment as claimed in claim 1, wherein the silanes are present in pure form with defined n or in mixtures with different n.

8. The pearlescent pigment as claimed in claim 1, wherein the platelet-shaped substrate is selected from the group consisting of
   oxide coated mica flakes,
   oxide coated glass flakes,
   oxide coated alumina flakes,
   oxide coated $SiO_2$ flakes,
   bismuth oxychloride flakes,
   pure $TiO_2$ flakes, and
   mixtures thereof, wherein the oxide coating comprises a layer of $TiO_2$; a layer of iron oxide; a first layer of $TiO_2$ and a second layer of iron oxide; or a first layer of iron oxide and a second layer of $TiO_2$.

9. The pearlescent pigment as claimed in claim 1, wherein the metal oxide is or comprises $TiO_2$.

10. An article provided with a coating comprising pearlescent pigment as claimed in claim 1.

11. The article as claimed in claim 10, being a vehicle body or an architectural facing.

12. The pearlescent pigment as claimed in claim 1, wherein the alkylsilane is applied using an alkylsilane having the formula $R_{(4-z)}Si(X)_z$ where R is a substituted or unsubstituted, unbranched or branched alkyl chain having 10 to 22 carbon atoms, X is a halogen and/or alkoxy groups, and z is an integer from 1 to 3.

* * * * *